3,446,971
OPTICAL RANGING SYSTEM USING A BEAT FREQUENCY RESPONSIVE PHOTOMULTIPLIER

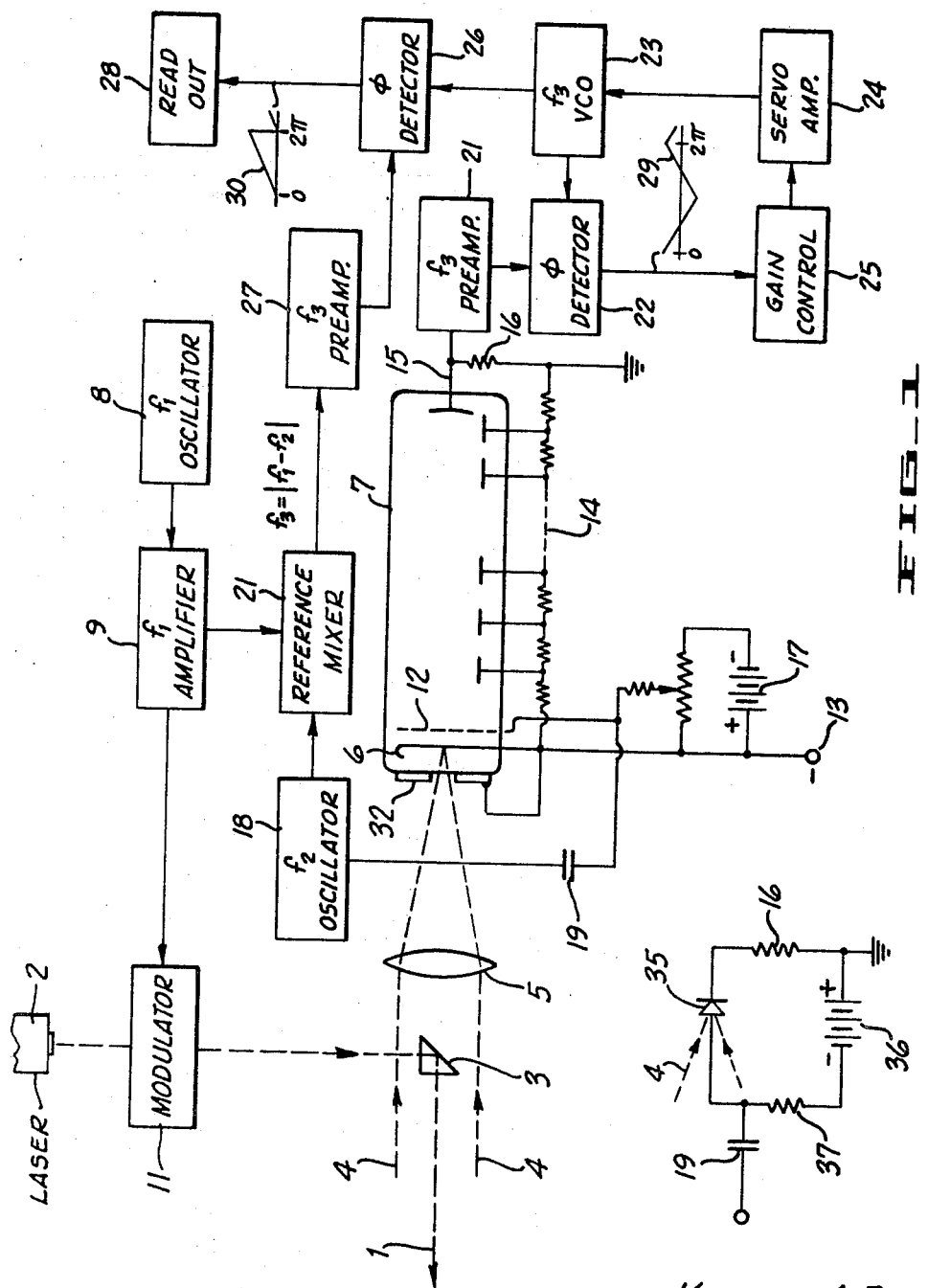

Kenneth A. Ruddock, Palo Alto, Calif., assignor to Spectra-Physics, Inc., Mountain View, Calif., a corporation of California
Filed May 31, 1966, Ser. No. 553,918
Int. Cl. H01j 39/12, 39/16
U.S. Cl. 250—207                        12 Claims

ABSTRACT OF THE DISCLOSURE

An optical ranging system in which the source radiation is modulated at a first frequency and intercepted by a photomultiplier tube after travelling over the distance to be measured. A fixed oscillator signal at a second frequency is applied to a grid positioned adjacent the photocathode of the multiplier tube, thereby generating a photocurrent signal at a beat frequency, substantially lower than the first frequency, at which the photomultiplier is reliably responsive. The beat frequency signal is phased detected to provide a continuous indication of the distance to be measured. The beat frequency phase detection system includes a local oscillator which is phase locked to the beat frequency signal through a linear phase detector and a servo amplifier in order to reproduce the beat frequency signal with enhanced signal-to-noise ratio. The gain of the servo amplifier can be varied in order to vary the response time without distorting the wave shape of the ramp function read-out signal which is obtained by nonlinear detection of the local oscillator output.

---

The present invention relates in general to modulated-beam optical ranging devices, and more particularly to an improved detection technique for such devices.

In a typical modulated-beam ranging system, a modulated optical radiation beam is transmitted over an unknown distance to an object which reflects the radiation back to a photodetector, and the phase of the detected modulation on the return beam is measured to determine the unknown distance. The resolution of such a system to small changes in distance improves with increasing modulation frequency. In practical operation, however, the maximum modulation frequency is limited by the characteristics of the photodetector.

For example, if a photomultiplier tube is used as the photodetector, its ability to yield a reliable modulation signal deteriorates as the modulation frequency increases above the cut-off frequency which is determined by transit time variations, interelectrode capacitances, applied voltage and other parameters. A previously proposed arrangement in which the transmit time effect is reduced consists of using the photomultiplier directly as a phase detector by applying a reference modulation frequency signal between the photocathode and first dynode and detecting the D-C component of the resulting anode current. The phase measurement is made by imposing a variable phase delay on the reference signal and noting the amount of delay required to null the detected photocurrent signal. This arrangement has significant disadvantages; for example, inaccuracies are introduced by instabilities in the variable phase delay networks and, in adidtion, the measurement process is too slow to permit continuous recording of rapidly changing distances as, for example, when it is desired to carry the device in an aircraft and record a continuous profile of the distance to the ground below.

The present invention provides a novel system in which the above problems are overcome and additional advantages are obtained. Generally speaking, this is accomplished by generating an intermediate frequency signal in the photodetector which has the same phase information as the received beam modulation, and then generating a signal which is reliably and continuously responsive to the phase of said intermediate frequency signal.

The various features and advantages of the present invention will become more apparent upon a consideration of the following specification, taken in connection with the accompanying drawing, wherein:

FIG. 1 is a schematic diagram of a ranging system in accordance with the present invention; and FIG. 2 is a schematic diagram of a modification to the system of FIG. 1.

Referring to FIG. 1, a directional and monochromatic light beam 1 is transmitted by a continuous-wave laser 2, for example a helium-neon gas laser operating at 6328 A., via a right-angle reflector 3, to a distant target (not shown). The optical beam is reflected back from the target and the reflected beam 4 is focused, by the lens 5 of a receiving telescope, on the photocathode 6 of photomultiplier tube 7.

An oscillator 8 generates a signal at frequency $f_1$ which is amplified by amplifier 9 and drives an optical modulator 11 to thereby modulate the transmitted beam 1 at the oscillator frequency $f_1$. For example, the modulator 11 may include a voltage variable retardation cell in combination with a quarter-wave plate polarization analyzer which imposes an amplitude modulation on the beam. The $f_1$ modulation on the received beam 4 is delayed in phase from the modulation signal applied to the transmitted beam 1 by an amount proportional to the distance to the reflecting target. This phase delay is monitored to provide a continuous indication of such distance in a manner now to be described.

Photomultiplier tube 7 includes a control grid 12 positioned adjacent the photocathode 6. A suitable tube having this construction is model F4027 grid-controlled multiplier phototube manufactured by ITT Industrial Laboratories of Fort Wayne, Ind. The photocurrent generated by cathode 6 is accelerated by the high voltage, for example −2 kv., applied to cathode terminal 13, amplified by the electron multiplier dynode chain 14, and collected at anode 15 to develop an output current through load resistor 16. The grid 12 is biased by source 17 to a voltage which is about 0.5 v. negative with respect to cathode 6. A signal from local oscillator 18 at frequency $f_2$ is applied to the grid 12 through blocking capacitor 19, the amplitude of this signal being sufficient to effectively switch the photocurrent off and on at the frequency $f_2$. The photocurrent emitted by cathode 6 is modulated at frequency $f_1$ in response to the amplitude modulation on the received beam 4, and, as a consequence of the grid switching, the current which is passed on to the multiplier section 14 has a component at the intermediate beat frequency $f_3 = |f_1 - f_2|$ thereby generating an $f_3$ signal in load resistor 16. A reference signal at $f_3$ is generated by beating an $f_2$ output from oscillator 18 with an $f_1$ output from modulator-driving amplifier 9 in a conventional electronic mixer 21.

The phase of the $f_3$ photomultiplier signal is shifted relative to the phase of the $f_3$ signal from mixer 21 by exactly the same number of electrical degrees as the $f_1$ frequency modulation on received beam 4 is shifted relative to the $f_1$ modulation on the transmitted beam 1, such phase shift being proportional to the distance to the target. Thus, in accordance with the present invention, distance is accurately and continuously measured by comparing the phases of the intermediate frequency $f_3$ signals. The frequency $f_3$ is sufficiently low that it can be reliably amplified by the electron multiplier 14.

In the system illustrated in FIG. 1, the $f_3$ phase comparison is made by amplifying the $f_3$ photomultiplier signal in amplifier 21 and phase comparing it in a linear phase detector 22 with an $f_3$ signal from a local voltage-controlled oscillator 23. The output of phase detector 22 is an error signal which is amplified by servo amplifier 24, whose gain is controlled by gain control 25, and applied to the oscillator 23 in order to phase lock same to the $f_3$ photomultiplier signal. The output of oscillator 23 is then fed to a non-linear phase detector 26 where it is compared with the $f_3$ reference signal which is amplified by amplifier 27. The output of phase detector 26 is then recorded, or otherwise continuously monitored, by a read-out device 28.

The output of linear phase detector 22 varies with the phase of the input from photomultiplier amplifier 21 as shown in plot 29. Due to the symmetry of this output about the zero axis, the zero crossing positions ($\pi/2$ and $3\pi/2$) of the signal are relatively unaffected by noise on the photomultiplier output, and one of these zero crossings is used as the phase-locking position for oscillator 23. The output of the local oscillator 23 is relatively free from noise and thus it can be advantageously used with the non-linear phase detector 26, the output of this phase detector having the non-symmetrical ramp function shape shown in plot 30. This ramp function has the advantageous characteristic of generating a unique value of voltage for each value of phase between integral multiples of $2\pi$. Thus, if a zero of the phase detector 26 corresponds to a certain reference position of the target, the value of this output will vary exactly linearly as the distance to the target changes over an interval equal to one-half wavelength at the modulation frequency $f_1$. In a typical arrangement, the frequency $f_1$ is stepped in intervals from 50 kc. to 500 kc. to 5 mc. to 50 mc., corresponding to half-wave measuring intervals of 10,000 feet, 1,000 feet, 100 feet and 10 feet, respectively, each step providing a successively higher sensitivity of distance measurement. Simultaneously, the local oscillator 18 is stepped so that the beat frequency $f_3=f_2-f_1$ is always 5 kc. and thus no measuring interval adjustments are required in the phase detection system.

This system has the further advantage that the response time of the final signal 30 can be varied by varying the servo gain control 25. Such variation in response time is desirable, for example, when the ranging system is flown from an aircraft in that the speed of response to changes in the height of reflecting objects on the ground can thereby be varied to control the amount of detail on a profile recording. This control in response time is achieved without the use of filter networks on the output of phase detector 26, and thus the linearity and sharp cut-off characteristics of the output as shown in plot 30 is preserved.

Another feature of the system of FIG. 1 is that a metallic plate or film 32 is attached to the receiving end of the photomultiplier tube 7. This plate forms a distributed capacitance with the cathode 6 which bypasses the distributed resistance of the cathode 6 for the reference signal $f_2$ from oscillator 18. This serves to eliminate the attenuation of the $f_2$ grid-cathode voltage caused by current flow in said cathode resistance. Thus it is possible to effectively switch the photocurrent with a very low $f_3$ voltage on grid 12, 1 to 2 volts peak to peak in the case of the model F4027 photomultiplier. This minimizes the problem of undesirable leakage of the $f_2$ grid signal into other parts of the receiver electronics.

FIG. 2 shows a modification of the present invention in which a photodiode 35 is substituted for photomultiplier 7 as the photodetector. The photodiode is back-biased by source 36, and by a voltage at frequency $f_2$ from oscillator 18 coupled by capacitor 19 across resistor 37. The received radiation 4 modulated at frequency $f_1$ is caused to be incident on photodiode 35. The resulting photocurrent is proportional to the incident radiation intensity and the instantaneous value of voltage across resistor 37 and source 36 in series. The resulting mixing will produce a component of current in load resistor 16 at the frequency $f_3$. Still other photodetector arrangements in which the photocurrent can be modulated by the reference frequency $f_2$ to form the beat frequency $f_3$ will occur to those skilled in the art; for example, a phototransistor can be used in which the $f_2$ signal is applied to the base-emitter junction and the $f_3$ signal component appears in the emitter-collector current.

I claim:

1. An optical ranging system, comprising: a source of optical radiation; means for modulating said optical radiation at a first frequency; a photodetector which generates a photocurrent responsive to optical radiation which has traveled from said source over a distance to be measured; means for modulating said photocurrent at a second frequency such that said photocurrent generates a signal at a beat frequency of said first and second frequencies, said beat frequency being substantially lower than said first frequency; and means for detecting the phase of said beat frequency signal as an indication of said distance.

2. An optical ranging system according to claim 1 wherein said photodetector is a photomultiplier tube, and a signal at said second frequency is applied to a grid positioned adjacent the photocathode of said tube.

3. An optical ranging system according to claim 2 including means for biasing said grid at a voltage which is negative with respect to said photocathode.

4. An optical ranging system according to claim 2 including means for bypassing the resistance of said photocathode at said second frequency.

5. An optical ranging system according to claim 1 including: means for mixing a reference signal at said first frequency with a reference signal at said second frequency to thereby generate a reference signal at said beat frequency; and means for comparing the phase of said photocurrent beat frequency signal with the phase of said reference beat frequency signal to generate a signal indicative of said distance.

6. An optical ranging system according to claim 5 wherein said last-named means includes: a local oscillator at said beat frequency; means for phase locking said local oscillator to said photocurrent beat frequency signal; and a phase detector responsive to the difference in phase between said local oscillator and said reference beat frequency signal.

7. An optical ranging system according to claim 6, including: means for generating a servo control signal which locks the phase of said local oscillator to the phase of said photocurrent signal; and means for varying the gain of said control signal to thereby vary the speed of response of said distance-indicating signal to changes in said distance.

8. An optical ranging system according to claim 6, wherein: said phase locking means includes a linear phase detector responsive to the difference in phase between said local oscillator and said photocurrent beat frequency signal; and said phase detector responsive to the difference in phase between said local oscillator and said reference beat frequency signal is a non-linear phase detector.

9. An optical ranging system, comprising: a source of optical radiation; means for modulating said optical radiation at a first frequency; means for detecting the modulation at said first frequency of optical radiation which has traveled from said source over a distance to be measured; means for generating a reference signal at a second frequency; means for mixing said detecting modulation with said second frequency reference signal thereby to generate a measurement signal at a beat frequency of said first and second frequencies, said beat frequency being substantially lower than said first frequency; means for mixing a signal generated by said modulating means at said first frequency with a signal generated by said reference signal means at said second frequency thereby to generate a reference signal at said beat frequency; a local oscillator at said beat frequency; means for phase locking said local oscillator to said measurement beat frequency signal; and a phase detector responsive to the difference in phase between said local oscillator and said reference beat frequency signal to thereby generate a signal indicative of said distance.

10. An optical ranging system according to claim 9, including: means for generating a servo control signal which locks the phase of said local oscillator to the phase of said measurement beat frequency signal; and means for varying the gain of said control signal to thereby vary the speed of response of said distance-indicating signal to changes in said distance.

11. An optical ranging system according to claim 9, wherein: said phase locking means includes a linear phase detector responsive to the difference in phase between said local oscillator and said measurement beat frequency signal; and said phase detector responsive to the difference in phase between said local oscillator and said reference beat frequency signal is a non-linear phase detector.

12. An optical ranging system according to claim 1, wherein said beat frequency is less than one megacycle.

References Cited

UNITED STATES PATENTS

| 2,206,072 | 7/1940 | Barthelemy. | |
| 2,768,309 | 10/1956 | Phillips et al. | 250—207 X |
| 2,929,949 | 3/1960 | Vincent | 250—207 X |
| 2,982,167 | 5/1961 | Friden et al. | |
| 3,237,011 | 2/1966 | Sterzer | 250—199 |
| 3,328,583 | 6/1967 | Davison | 250—199 |
| 3,339,457 | 9/1967 | Pun. | |

OTHER REFERENCES

Blattner and Sterzer: Heterodyne Receivers for R-F Modulated Light Beams, RCA Rev. 23, p. 407–412 (1962) TK 6540 R 122.

Chang et al.: Optical Phase Detection, IBM Technical Disclosure Bulletin, vol. 9, No. 1, June 1966.

WALTER STOLWEIN, *Primary Examiner.*

C. M. LEEDER, *Assistant Examiner.*

U.S. Cl. X.R.

250—199; 356—5